(12) United States Patent
Finkenzeller

(10) Patent No.: US 10,156,270 B2
(45) Date of Patent: *Dec. 18, 2018

(54) FRICTION CLUTCH

(71) Applicant: SCHAEFFLER TECHNOLOGIES AG & CO. KG, Herzogenaurach (DE)

(72) Inventor: Marc Finkenzeller, Gengenbach (DE)

(73) Assignee: SCHAEFFLER TECHNOLOGIES AG & CO. KG, Herzogenaurach (DE)

( * ) Notice: Subject to any disclaimer, the term of this patent is extended or adjusted under 35 U.S.C. 154(b) by 249 days.

This patent is subject to a terminal disclaimer.

(21) Appl. No.: 15/036,696

(22) PCT Filed: Oct. 20, 2014

(86) PCT No.: PCT/DE2014/200578
§ 371 (c)(1),
(2) Date: May 13, 2016

(87) PCT Pub. No.: WO2015/070859
PCT Pub. Date: May 21, 2015

(65) Prior Publication Data
US 2016/0327101 A1 Nov. 10, 2016

(30) Foreign Application Priority Data
Nov. 13, 2013 (DE) .................. 10 2013 223 093

(51) Int. Cl.
*F16D 13/04* (2006.01)
*F16D 13/52* (2006.01)
(Continued)

(52) U.S. Cl.
CPC ........... *F16D 13/757* (2013.01); *F16D 13/52* (2013.01); *F16D 13/54* (2013.01); *F16D 13/04* (2013.01); *F16D 2300/14* (2013.01)

(58) Field of Classification Search
CPC .......... F16D 13/04; F16D 13/52; F16D 13/54; F16D 2013/706; F16D 13/757; F16D 2300/14
See application file for complete search history.

(56) References Cited

U.S. PATENT DOCUMENTS 6,026,944 A * 2/2000 Satou .................. F16D 13/52
192/70.2
6,079,537 A 6/2000 Hofmann et al.
(Continued)

FOREIGN PATENT DOCUMENTS

DE 102009049253 A1 5/2010
DE 102010048827 A1 5/2011
(Continued)

OTHER PUBLICATIONS

International Search Report from EPO ISA dated Jan. 23, 2015.

*Primary Examiner* — Richard M Lorence
(74) *Attorney, Agent, or Firm* — Kevin L. Parks

(57) ABSTRACT

A friction clutch for coupling a drive shaft of a motor vehicle engine to a transmission input shaft of a motor vehicle transmission. An input disk carrier is couplable to the drive shaft and an output disk carrier is couplable to the transmission input shaft. A return spring positions the output part in a defined initial position relative to the input part. The return spring allows a higher pressing force between the input part and the output part in the engaged state when the friction lining is in a worn condition than when the friction lining is in the non-worn condition. Through the use of the return spring to also transfer torque, a pressing force that reduces as the friction linings become worn can be compensated for by changing the direction of force of the torque introduced through the return spring for reliable engagement of the friction clutch.

11 Claims, 2 Drawing Sheets

(51) Int. Cl.
*F16D 13/54* (2006.01)
*F16D 13/75* (2006.01)

(56) References Cited

U.S. PATENT DOCUMENTS

| | | | | |
|---|---|---|---|---|
| 6,189,667 | B1* | 2/2001 | Dorfler | F16D 13/64 |
| | | | | 192/52.5 |
| 2003/0066729 | A1* | 4/2003 | Feldhaus | F16D 21/06 |
| | | | | 192/48.8 |
| 2016/0290413 | A1* | 10/2016 | Finkenzeller | F16D 13/52 |

FOREIGN PATENT DOCUMENTS

| | | | |
|---|---|---|---|
| EP | 1980766 | A1 | 10/2008 |
| GB | 2207965 | A | 2/1989 |
| WO | 2008058508 | A1 | 5/2008 |

\* cited by examiner

FRICTION CLUTCH

CROSS-REFERENCE TO RELATED APPLICATION

This application is the U.S. national phase application under 35 U.S.C. § 371 of International Application Serial No. PCT/DE2014/200578, having an international filing date of 20 Oct. 2014, and designating the United States, which claims priority based upon German Patent Application No. DE 10 2013 223 093.1, filed on 13 Nov. 2013, the entire contents of each of which applications are hereby incorporated by reference herein to the same extent as if fully rewritten.

BACKGROUND OF THE INVENTION

Field of the Invention

The present invention relates to a friction clutch, in particular a wet, multi-plate clutch, by means of which a drive shaft of a motor vehicle engine can be coupled to at least one transmission input shaft of a motor vehicle transmission.

Description of the Related Art

From DE 10 2010 048 827 A1 a wet multi-plate clutch is known for coupling a drive shaft of a motor vehicle motor to a transmission input shaft of a motor vehicle transmission, wherein a pre-clutch having a ramp mechanism is provided in order to achieve an increased pressing force when the friction clutch is in the engaged state.

There is a constant need to be able to engage a friction clutch reliably with little engineering effort and expense.

An object of the invention is to identify measures which make it possible to engage a friction clutch reliably with little engineering effort and expense.

SUMMARY OF THE INVENTION

According to the present invention a friction clutch is provided, in particular a wet, multi-plate clutch, for coupling a drive shaft of a motor vehicle engine to at least one transmission input shaft of a motor vehicle transmission. The clutch includes an input part that is couplable to the engine drive shaft, in particular an input disk carrier for introducing torque, and an output part that is couplable to the transmission input shaft, in particular an output disk carrier, for extracting torque. At least one wearing friction lining is provided between the input part and the output part for transferring torque frictionally between the input part and the output part. A return spring in the form of a leaf spring is provided for positioning the output part in a defined initial position relative to the input part, along with an actuating element for moving the output part out of the initial position relative to the input part. At least a portion of the torque transferred by the friction clutch is transferable through the return spring, wherein the return spring runs in an essentially tangential direction between a torque introduction point and a torque extraction point, and runs at an oblique angle of incidence relative to a radial plane of the friction clutch. The return spring allows a higher pressing force between the input part and the output part in the engaged state when the at least one friction lining is in a worn condition.

The return spring in the form of a leaf spring is used not only to move to a defined position of the input part relative to the output part in the initial position, but also to transfer at least a portion of the torque introduced into the friction clutch, preferably the entire torque introduced into the friction clutch. Use is made of the knowledge that the travel distance of the output part relative to the input part increases over the wear range of the friction linings, and that as a result the angle of incidence of the return spring to the radial plane changes. Because of the increasing or decreasing angle of incidence, the ratio of forces on the return spring changes in the manner of an obliquely operated knee lever, so that the portion of force running in the longitudinal direction of the return spring changes. Correspondingly, at the output end of the return spring in the direction of the flow of force, the portion of force pointing in the axial direction of the friction clutch changes, so that depending on the travel distance of the pressing part, which corresponds to the wear state of the friction linings, a correspondingly changing axial force can be exerted by the return spring, which is added to or subtracted from the pressing force, depending on the application case, in order to at least compensate for a decreasing pressing force due to wear when the friction clutch is in the engaged state. As a result, it is possible when the friction clutch is engaged with worn friction linings that the pressing force acting on the friction lining does not decrease but rather may even increase, so that even a coefficient of friction which decreases somewhat under wear may be compensated for. That makes it possible to guarantee reliable engagement of the friction clutch even with worn friction linings. The return spring which is already provided can be used to that end without providing additional power transmission devices for that purpose, for example ramp systems, so that a simple construction of the friction clutch having few components can be achieved. Through the use of the return spring running tangentially obliquely to the radial plane to also transfer torque, a pressing force which decreases as the friction linings become worn can at least be compensated for by changing the direction of force of the torque introduced through the return spring, so that reliable engagement of a friction clutch is made possible with little construction expense.

The friction clutch is designed in particular as a multi-plate clutch having a plurality of friction pairings provided one behind the other between the input part and the output part. Preferably frictional heat can be dissipated from the friction clutch with the aid of a coolant, in particular oil, so that the friction clutch can be designed in particular as a wet, multi-plate clutch. The input part and the output part can have a plate carrier, on which plates which are movable in the axial direction are carried. The respective plates can be provided with friction linings, or they can be designed as a steel plate.

In the initial position, when no actuating force is introduced through the actuating element, the friction clutch can be disengaged ("normally open") or engaged ("normally closed"). Depending on whether the return spring is situated before or after the at least one friction lining in the flow of force, and whether the friction clutch is designed as normally closed or normally open, the return spring can be loaded under pressure or under tension to transfer torque when the motor vehicle engine coupled to the friction clutch is in traction mode. If the return spring is under pressure loading to transfer torque, the return spring in the form of a leaf spring can be subjected to bending up to a force below a buckling force and running in the longitudinal direction of the leaf spring.

In particular, a plurality of return springs are provided, which are preferably distributed uniformly in the circumferential direction at a common nominal radius, so that the forces acting on the individual return springs can be reduced. The return spring runs in particular essentially tangentially, and because of its angle of incidence can bridge an axial distance relative to the radial plane. It is also possible for a portion of the return spring to run in the radial direction, in which case the portion of the longitudinal extension of the return spring is significantly larger in the tangential direction than in the radial direction. The return spring has a plurality of spring layers arranged on top of one another, each of them made of sheet steel. A plurality of spring layers can be riveted together, for example. The actuating element can be designed as a lever element, in particular a lever spring that is pivotable around a pivot point running in the circumferential direction, preferably in the form of a diaphragm spring, so that transmission of an actuating force acting on the actuating element can be achieved through the lever effect. The actuating element can also be designed as a purely axially shifted actuating cup, which provides essentially no force transmission for the actuating force acting on the actuating element except for an elastic deformation of its own.

Preferably, when torque is transferred by the tangential course of the return spring, the return spring provides a transmission of power in the axial direction, which changes over the range of wear of the at least one friction lining. The transmission of power essentially balances out to the initial situation or overcompensates for a change in a return force of the return spring, which changes over the range of wear of the at least one friction lining. The return spring in the form of a leaf spring can change its angle of incidence more and more severely away from the initial situation when the travel distance changes as the friction linings wear, which also causes the transmission ratio between the torque acting on the return spring on the input side and the axial force operating in the axial direction on the output side to change. The force transmission of the return spring, which changes depending on the wear of the friction linings, can be chosen and designed so that a wear-based decrease in the pressing force on the friction linings when the friction clutch is in the engaged state can at least be balanced out or compensated for. At the same time, a decrease in the actuating force acting on the actuating element, which can occur as the travel distance of the actuating element increases, can also be compensated for.

In a preferred embodiment, an axially fixed clutch part is provided, in particular a clutch cover, the return spring being fastened directly or indirectly to the fixed clutch part and to the actuating element. The return spring can easily be fastened to the clutch part, for example by screwing or riveting. Through the fixed clutch part in particular, at least part of the torque that is transferred by the friction clutch can be transferred to the return spring, while the return spring, in turn, can transfer that torque directly or indirectly to the part that is moved by the actuating element. That enables the return spring to be integrated easily into the torque flow of the friction clutch.

When the friction clutch is in the engaged state, the angle of incidence is preferably greater when the at least one friction lining is worn than when the at least one friction lining is not worn. In particular, if the friction clutch is designed as normally open, the pressing force in the worn state can increase as a result due to the portion of the torque introduced through the return spring.

In particular, a pressure plate movable axially by the actuating element is provided between the actuating element and the output part to press the output part between the pressure plate and the input part, the return spring being connected to the pressure plate. The return force of the return spring can act on the actuating element through the pressure plate. In addition, the torque introduced through the return spring can be transferred through the pressure plate, so that the return spring in particular can introduce through the pressure plate an axial force which increases with wear in order to increase the pressing force with wear.

In a preferred embodiment, a clutch plate that is connectible to the transmission input shaft is provided, while the output part is movable axially relative to the clutch plate, the return spring being connected to the output part and the clutch plate. The clutch plate, which preferably has at least one friction lining, is connectible to the transmission input shaft, in particular by means of a spline connection. When the clutch is in the engaged state, the clutch plate can be pressed between the input part and the output part. The clutch plate can thereby essentially fulfill the function of a friction plate, the clutch plate being movable axially relative to the output part. In this embodiment, the return spring is positioned after the friction lining in the flow of torque, in addition to or alternatively to a return spring positioned before the friction lining in the flow of force. That makes it possible to stress the return spring under tension with the motor vehicle motor in traction mode, so that even with higher forces operating in the longitudinal direction of the return spring there is no likelihood of buckling. That avoids a bending load on the return spring in the form of a leaf spring in traction mode. As a result, the return spring is subjected to lesser loads. In particular, when the friction clutch is in the engaged state, the angle of incidence is smaller when the at least one friction lining is worn than when the at least one friction lining is not worn.

By particular preference, the actuating element acts on the output part on an axial side facing away from the clutch plate. That makes the return spring easily accessible during assembly. As a result, the output part is positioned between the actuating element and the return spring. When the output part is moved into the initial position indirectly by means of the output part, the return spring can thereby also move the actuating element by means of a return force into a position which corresponds to the initial position of the output part.

In particular, the friction clutch is disengaged in the initial position. The friction clutch is thereby configured as normally open, so that if a component fails, the friction clutch disengages and transfers no torque. This results in good fail-safe operation. In particular, with a dual clutch having two such friction clutches it is possible to prevent both friction clutches of the dual clutch from remaining engaged due to failure of a component.

In a preferred embodiment, an axially fixed clutch part is provided, in particular a clutch cover. The input part is movable axially relative to the fixed clutch part by the actuating element, while the return spring is connected to the fixed clutch part and the input part, the return spring being connected to the clutch part on an axial side of the fixed clutch part facing away from the output part. The friction clutch is designed in particular as normally closed. The return spring can easily be fastened to the clutch part, for example by screwing or riveting. That enables the return spring to be integrated easily into the torque flow of the friction clutch. In particular, the return spring can be provided essentially in an outer and easily accessible area of the friction clutch, which makes assembly easier. In particular, when the friction clutch is in the engaged state, the angle of incidence is greater when the at least one friction lining is worn than when the at least one friction lining is not worn.

The input part is preferably limitedly rotatable relative to the clutch part. That makes it possible to compensate for an offset of the input part in the circumferential direction relative to the clutch part when the angle of incidence of the return spring changes.

The present invention also relates to a dual clutch for coupling a drive shaft of a motor vehicle engine, the dual clutch having a first transmission input shaft and/or a second transmission input shaft with a first friction clutch which, as described above, can be designed and refined to couple the drive shaft to the first transmission shaft, and a second friction clutch which, as described above, can be designed and refined to couple the drive shaft to the second transmission input shaft. Through the use of the return spring of the respective friction clutch running tangentially obliquely to the radial plane to also transfer torque, a pressing force that decreases as the friction linings become worn can at least be compensated for by changing the direction of force of the torque introduced through the return spring, so that reliable engagement of the dual clutch is made possible with little construction expense. The first friction clutch and the second friction clutch are preferably nested one within the other, so that the first friction clutch and the second friction clutch, viewed in the radial direction, partially overlap, in particular with the input part and/or the output part. That results in an especially compact and space-saving construction of the dual clutch.

BRIEF DESCRIPTION OF THE DRAWINGS

The present invention will be explained below by way of example with reference to the accompanying drawings, on the basis of preferred exemplary embodiments. The features illustrated in the drawings and described below can each apply to an aspect of the present invention, both individually and in combination. The figures show the following.

DESCRIPTION OF THE PREFERRED EMBODIMENTS

Figure 1:
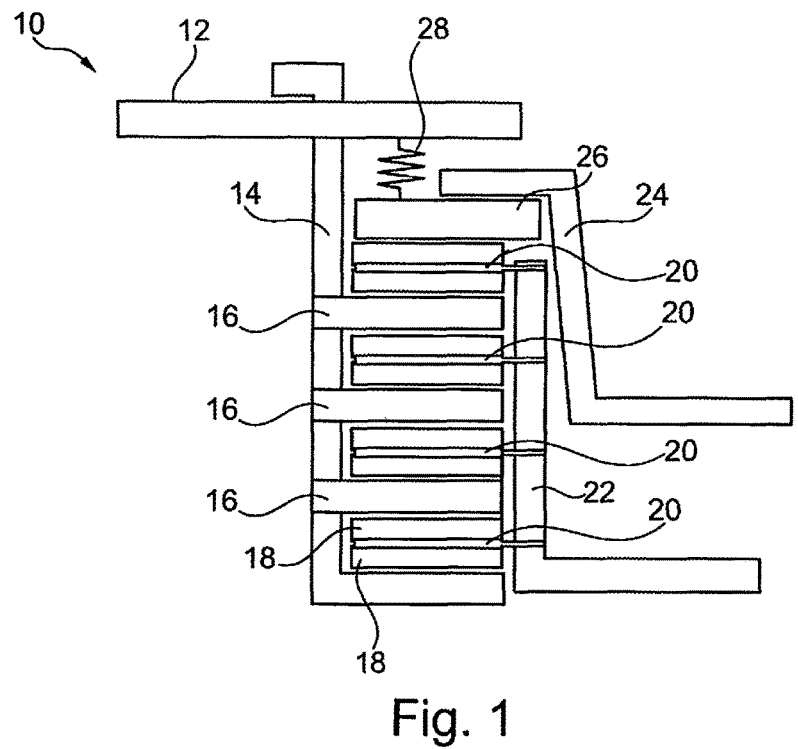
FIG. 1 is a schematic diagram of a friction clutch in a first embodiment.

The friction clutch 10 shown in FIG. 1 has a clutch part 12 in the form of a clutch cover, which is designed to co-rotate but to be axially fixed. Coupled to the clutch part 12 is an input part 14 in the form of a plate carrier, which is fastened immovably in the axial direction in particular to the clutch part 12. The input part 14 has a plurality of steel plates 16 which are movable in the axial direction, between which are situated friction plates 20, provided on both sides with a wearing friction lining 18, of an output part 22 in the form of a plate carrier. In order to create a flow of torque between the input part 14 and the output part 22 when the friction clutch 10 is in the engaged state, the steel plates 16 and the friction plates 20 can be pressed together frictionally with the aid of a pressure plate 26 which is movable axially by an actuating element 24 in the form of an actuating cup.

In the embodiment shown in FIG. 1, a return spring 28 in the form of a leaf spring is connected to the pressure plate 26 and the clutch part 12. When the friction clutch designed as normally open closes, the return spring 28 is able to build up a return force so as to lift the pressure plate 26 when an actuating force acting on the actuating element 24 decreases, which causes the friction clutch 10 to disengage and the actuating element 24 to be returned to an initial position corresponding to the disengaged state of the friction clutch 10. When wear occurs to the friction linings 18, the travel distance of the pressure plate 26 to engage the friction clutch 10 increases, whereby the return spring 28 is deflected more severely and provides a stronger return force. However, at the same time, part of the torque of a motor vehicle engine introduced through the clutch part 12 is transferred through the return spring 28 to the pressure plate 26. As this occurs, the return spring 28 in the form of a leaf spring is placed under pressure without buckling. As a result of the increased travel distance of the pressure plate 26 because of friction lining wear, there develops in the return spring an increased angle of incidence of the longitudinal extension of the return spring 28 relative to a radial plane, which causes an increased portion of force of the torque transferred through the return spring 28 in the axial direction to develop in order to press the friction linings 18 when the friction clutch 10 is in the engaged state. That more than balances out the increasing return force of the return spring 28. When the friction linings 18 are in the worn state, the pressing force acting on the friction linings 18 when the friction clutch 10 is engaged, at least at the pressure plate 26, is even higher than when the friction linings 18 are not worn.

Figure 2:
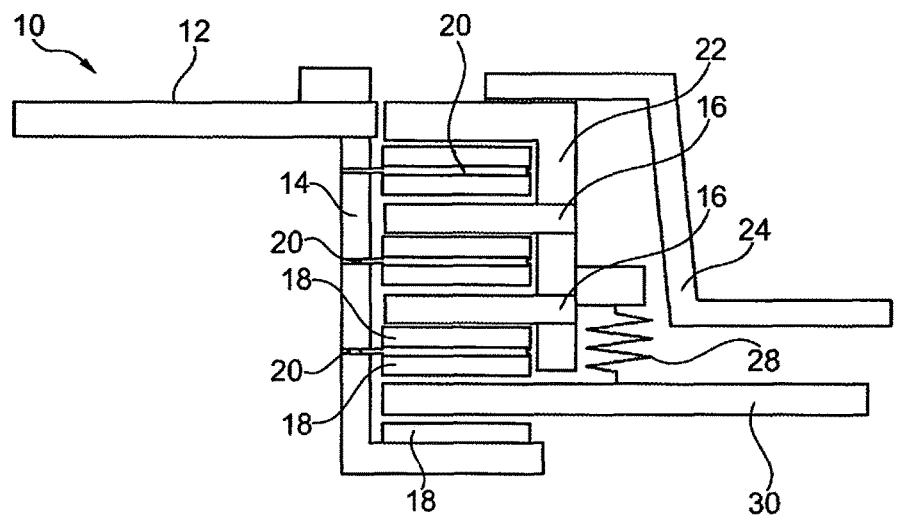
FIG. 2 is a schematic diagram of a friction clutch in a second embodiment.

In the embodiment of the friction clutch 10 designed as normally open and shown in FIG. 2, in comparison to the embodiment of the friction clutch 10 shown in FIG. 1, includes in addition a clutch plate 30 that is movable axially relative to the output part 22.

Furthermore, it is the output part 22 that carries the steel plates 16, while the input part 14 carries the friction plates 20. The clutch plate 30 replaces a steel plate 16, which otherwise would have been formed by the output part 22. The actuating element 24 acts directly on the output part 22, without a separate pressure plate. In the illustrated embodiment, the return spring 28 is connected to the output part 22 and to the clutch plate 30. That makes it possible to place the return spring 28 under tension when in the traction mode, which reduces the risk of buckling of the return spring 28.

Figure 3:
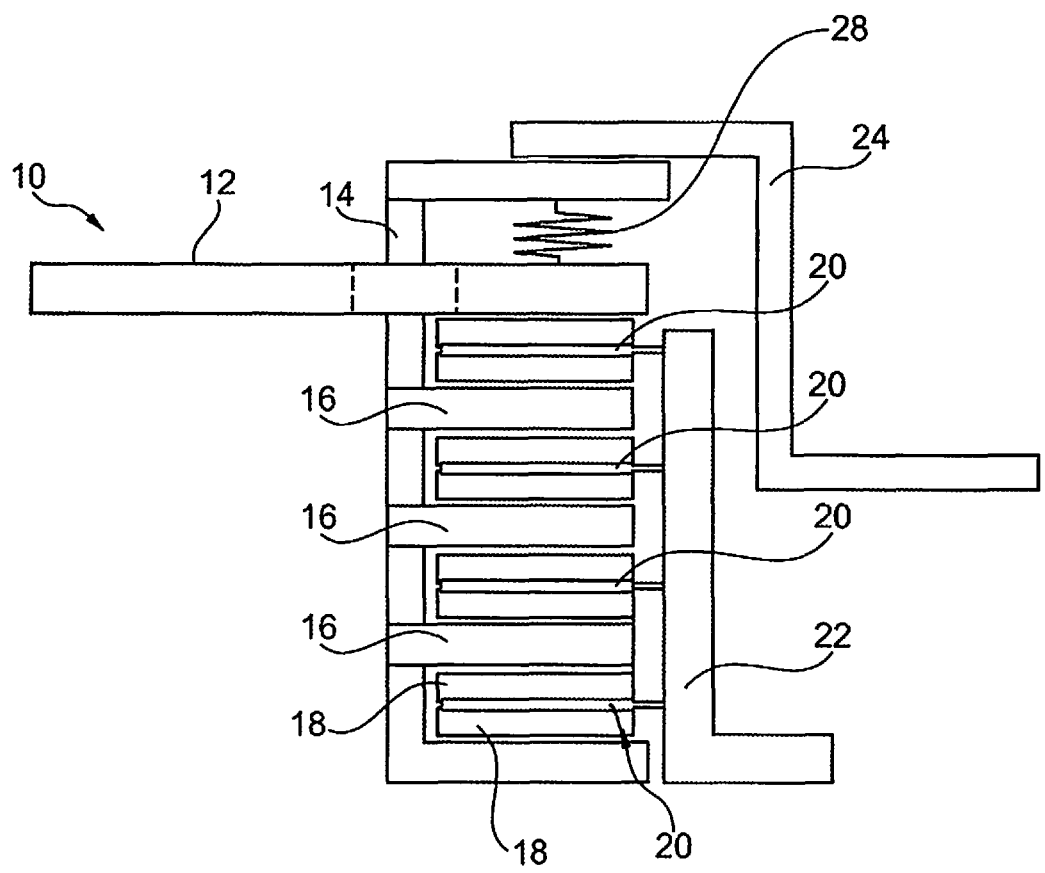
FIG. 3 is a schematic diagram of a friction clutch in a third embodiment.

In the embodiment of the friction clutch 10 designed as normally closed and shown in FIG. 3, in comparison to the embodiment of the friction clutch 10 shown in FIG. 1, the return spring 28 is connected to the clutch part 12 and to the input part 14, the latter of which is movable axially relative to the clutch part 12. The actuating element 24 acts directly on the input part 14, without a separate pressure plate. The input part 14 is designed so that it is limitedly rotatable relative to the clutch part 12, in order to make a limited rotation of the input part 14 relative to the clutch part 12 possible by means of the travel distance of the input part 14 when the angle of incidence of the return spring 28 changes. In the embodiment shown in FIG. 3 it is possible to place the return spring 28 under pressure when in the traction mode.

The invention claimed is:

1. A friction clutch for coupling a drive shaft of a motor vehicle engine to at least one transmission input shaft, said friction clutch comprising:
   an input part including an input plate carrier that is couplable to a motor vehicle engine drive shaft to transmit torque,
   an output part including an output plate carrier that is couplable to a transmission input shaft to transmit torque from the input part to the output part,
   at least one wearing friction lining provided between the input part and the output part to transmit torque frictionally between the input part and the output part,
   a return spring to position the output part in a defined initial position relative to the input part, an actuating element to move the output part relative to the input part out of an initial position, wherein at least a part of the torque transmitted by the friction clutch is transmitted through the return spring, wherein the return spring extends between a torque introduction point and a torque extraction point in an essentially tangential direction and extends obliquely at an angle of incidence to a radial plane of the friction clutch, wherein the return spring permits a greater pressing force between the input part and the output part in the engaged state of the friction clutch when the at least one friction lining is worn than when the at least one friction lining is not worn, and wherein the friction clutch is a wet, multi-plate clutch.

2. A friction clutch according to claim 1, wherein when torque is transmitted by the tangential course of the return spring the return spring provides a transmission of power in an axial direction of the friction clutch that changes over a range of wear of the at least one friction lining, wherein the transmission of power substantially balances out to one of an initial condition of the clutch and a condition that overcompensates for a change in a return force that changes over the range of wear of the at least one friction lining.

3. A friction clutch according to claim 1, including an axially fixed clutch part in the form of a clutch cover, wherein the return spring is connected between the axially fixed clutch part and the actuating element.

4. A friction clutch according to claim 3, including a pressure plate that is movable axially by the actuating element is provided between the actuating element and the output part to press the output part between the pressure plate and the input part, and the return spring is connected to the pressure plate.

5. A friction clutch according to claim 1, including a clutch plate which is connectible connected to the transmission input shaft, wherein the output part is movable axially relative to the clutch plate, and the return spring is connected to the output part and to the clutch plate.

6. A friction clutch according to claim 5, wherein the actuating element acts on the output part on an axial side facing away from the clutch plate.

7. A friction clutch according claim 1, wherein the friction clutch is disengaged in the initial position.

8. A friction clutch according to claim 1, including an axially fixed clutch part in the form of a clutch cover, wherein the input part is movable axially relative to the clutch part by the actuating element, while the return spring is connected to the clutch part and to the input part, and the return spring is connected to an axial side of the clutch part facing away from the output part.

9. A friction clutch according to claim 8, wherein the input part (14) is limitedly rotatable relative to the clutch part.

10. A dual clutch for coupling a drive shaft of a motor vehicle engine to a first transmission input shaft and to a second transmission input shaft, said dual clutch comprising: a first friction clutch according to claim 1 for coupling the drive shaft to the first transmission shaft, and a second friction clutch according to claim 1 for coupling the drive shaft to the second transmission input shaft.

11. A friction clutch according to claim 1, wherein the return spring is a leaf spring.

* * * * *